(12) United States Patent
Forster

(10) Patent No.: US 8,884,764 B2
(45) Date of Patent: Nov. 11, 2014

(54) METHOD, SYSTEM, AND APPARATUS FOR RFID REMOVAL DETECTION

(75) Inventor: Ian J. Forster, Essex (GB)

(73) Assignee: Avery Dennison Corporation, Glendale, CA (US)

(*) Notice: Subject to any disclaimer, the term of this patent is extended or adjusted under 35 U.S.C. 154(b) by 455 days.

(21) Appl. No.: 13/034,899

(22) Filed: Feb. 25, 2011

(65) Prior Publication Data

US 2012/0218110 A1    Aug. 30, 2012

(51) Int. Cl.
| | |
|---|---|
| G08B 13/14 | (2006.01) |
| G08B 13/24 | (2006.01) |
| G06K 19/077 | (2006.01) |
| G06K 19/073 | (2006.01) |
| G08B 29/04 | (2006.01) |

(52) U.S. Cl.
CPC ...... *G08B 13/2417* (2013.01); *G06K 19/07749* (2013.01); *G06K 19/07372* (2013.01); *G08B 13/2431* (2013.01); *G08B 13/2448* (2013.01); *G08B 29/046* (2013.01); *G06K 19/07381* (2013.01)
USPC ........................................ 340/572.1; 235/492

(58) Field of Classification Search
CPC ................................................ G06K 19/07749
USPC .......... 340/572.1, 572.7, 572.8, 551; 235/492
See application file for complete search history.

(56) References Cited

U.S. PATENT DOCUMENTS

| | | | | |
|---|---|---|---|---|
| 5,237,307 | A  * | 8/1993  | Gritton ..................... | 340/572.1 |
| 688,850 | A1 | 5/2005 | Atherton | |
| 6,982,452 | B2 * | 1/2006 | Beigel ........................... | 257/303 |
| 7,876,222 | B2 * | 1/2011 | Calvarese .................. | 340/572.1 |
| 2004/0066296 | A1 * | 4/2004 | Atherton .................... | 340/572.1 |
| 2006/0208095 | A1 * | 9/2006 | Yamagajo et al. ............ | 235/492 |
| 2006/0214789 | A1 * | 9/2006 | Posamentier et al. ..... | 340/572.1 |
| 2006/0261959 | A1 | 11/2006 | Worthy et al. | |
| 2010/0259392 | A1 | 10/2010 | Chamandy et al. | |

FOREIGN PATENT DOCUMENTS

| | | |
|---|---|---|
| EP | 0594324 | 4/1994 |
| EP | 1703447 | 9/2006 |
| GB | 2262015 | 6/1993 |
| WO | 02/077939 | 10/2002 |

OTHER PUBLICATIONS

International Search Report dated Jun. 4, 2012 for International Application No. PCT/US2012/026711 filed Feb. 27, 2012.
Written Opinion dated Jun. 4, 2012 for International Application No. PCT/US2012/026711 filed Feb. 27, 2012.

* cited by examiner

*Primary Examiner* — John A Tweel, Jr.
(74) *Attorney, Agent, or Firm* — Avery Dennison Corporation

(57) ABSTRACT

According to one exemplary embodiment, an apparatus, system and method for forming RFID labels is disclosed. The RFID labels can include an RFID chip, at least one antenna element and at least one conductive material. The RFID chip may then transmit desired signals based upon a coupling of the conductive material to the RFID chip.

18 Claims, 6 Drawing Sheets

METHOD, SYSTEM, AND APPARATUS FOR RFID REMOVAL DETECTION

FIELD OF THE INVENTION

The present invention is in the field of forming radio frequency identification (RFID" labels and preventing RFID tampering of such labels).

BACKGROUND OF THE INVENTION

The use of radio frequency identification (RFID) tags to track, identify and locate goods has grown significantly in recent years. RFID tags allow manufacturers, distributors and retailers, amongst others, to regulate products and inventory, quickly determine production, manufacture, distribution or retail needs and efficiently intake and outtake items utilizing RFID tags. The RFID tags themselves can provide any desired product data and may be scanned or read in any of a variety of manners.

Another feature of RFID tags is their use with retail products as a theft deterrent and prevention device. RFID tags may be coupled with a retail product in such a manner that an ordinary consumer may be dissuaded from removing the RFID tag, for example by way of a human-perceptible warning or by showing that the product would be damaged if the RFID tag were removed by unauthorized personnel using inappropriate tooling. Additionally, retailers, or any other entity desiring to prevent theft or maintain inventory control, may have RFID scanners or readers positioned at locations, such as exits, that can cause an alarm or provide other indicia that a product has been removed or relocated without authorization.

However, theft of products which are coupled to RFID tags still occurs. For example, if a product is coupled with an RFID tag, a thief may attempt to cut, tear or otherwise damage the RFID tag in order to remove it from the product. Often, such acts can occur in dressing rooms or other locations where surveillance is either not permissible or not possible. Various methods known in the prior art, however, are often defeated or rendered inoperable due to tampering with the RFID devices.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

According to one exemplary embodiment, an apparatus, system and method for forming RFID labels and preventing RFID tampering are disclosed. One exemplary embodiment can include an RFID label with an RFID chip, at least one antenna coupled to the RFID chip and a conductive material coupled to the RFID chip that influences a response signal sent from the RFID label when it is read.

Another exemplary embodiment may describe a method of preventing tampering to products having RFID tags. This method can include steps for forming an RFID label with an RFID chip, at least one antenna coupled to the RFID chip and a conductive material coupled to the RFID chip; sending a first signal from the RFID chip when the coupling between the RFID chip and the conductive material is intact; and sending a second signal from the RFID chip when the coupling between the RFID chip and at least a portion of the conductive material is not intact.

Another exemplary embodiment may describe a method of forming a tamper-resistant RFID tag. This method can include steps for disposing an RFID chip on a substrate; disposing at least a first antenna element on the substrate; coupling the at least first antenna element to the RFID chip; disposing a conductive loop on the substrate; and connecting a first portion of the conductive loop to a first terminal on the RFID chip and connecting a second portion of the conductive loop to a second terminal on the RFID chip in such a manner that there is no straight-line access from an area outside the RFID tag to the RFID chip.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 9b is a side view of the conductive material shown in FIG. 9a;

DETAILED DESCRIPTION OF THE INVENTION

Figure 1:
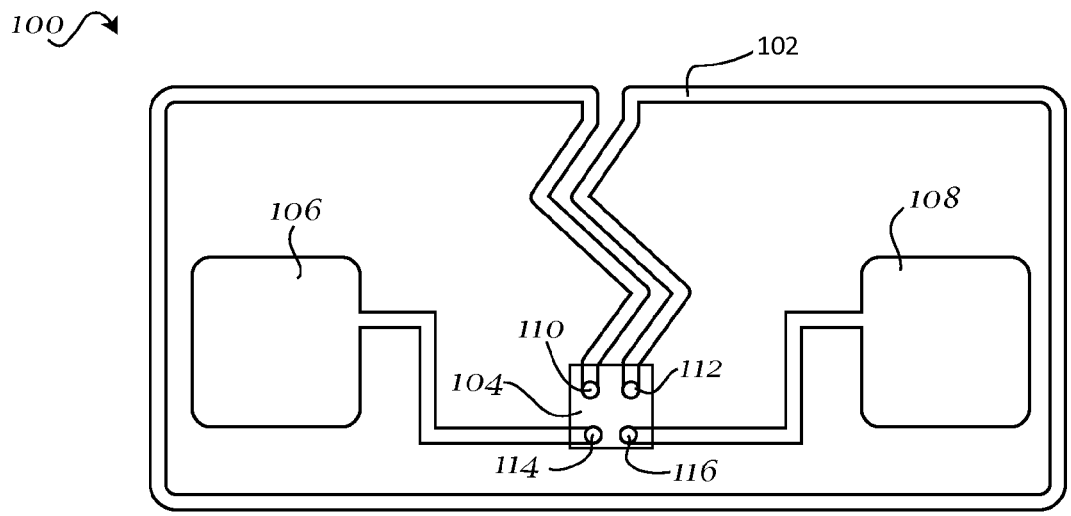
FIG. 1 is an exemplary view of an RFID label with a conductive loop.

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Generally referring to FIGS. 1-10, an apparatus, method and system for the limitation, prevention, or notification of tampering with RFID tags may be described. The apparatus, method and system can include an RFID tag that may send any of a number of signals as desired or resulting from a condition or state of the RFID tag. For example, if an RFID tag having an RFID chip is read in a normal state, it may provide a first data message. However, if an RFID tag having an RFID chip were read after it had been tampered with or during the course of tampering, it may provide a second data message to indicate such tampering.

The RFID chip may sense the state of a connection using a DC signal, AC signal, such as a sinusoid or sequence of one or more digital pulses or a combination of both. A digital state in the RFID chip may be set when the signal is received at above or below a defined voltage or current, when the signal is received before, after or at a defined time, or in a defined phase with respect to the signal sent or a combination of the above. In the following, a closed path is defined as one that allows the connection sensing signal sent to be received in a way that meets a set of criteria and an open path is defined as one that causes the sensing signal sent to be received in a way that does not meet the criteria. The connection sensing may involve one, two or a multiplicity of ports. For a one port system, the determination of open or closed path is made on a single port combining both sending of a sensing signal and receiving or measuring the response. For a two port system the sending of a sensing signal and receiving may be on separate ports. In all cases one or more ports may be common with one or more antenna connection ports. Examples of a closed path/open path and the signal used to sense the state are shown below;

| Open Path | Closed Path | Sensing Signal |
|---|---|---|
| Resistance > X | Resistance < X | DC, AC or combination of both |
| Capacitance < X | Capacitance > X | AC/time based measurement with DC |
| Inductance > X | Inductance < X | AC/time based measurement with DC |

As shown in exemplary FIG. 1, one exemplary embodiment may include a structure for an RFID tag. The structure 100 can include a conductive loop 102, which may also be referred to as a conductive track, sensor loop or sensory loop, around the periphery of the structure 100. The conductive loop 102 may be formed in such a manner that a detection may be made or notification, in the form of a data message sent from the RFID chip 104 and any number of antennas, for example antennas 106 and 108, may be provided upon a tampering or breach of the structure 100 or any cut, slit, deformation or breakage of the conductive loop 102 changing it from a closed path to an open path.

Still referring to exemplary FIG. 1, the conductive loop 102 may encircle, surround or otherwise encompass or extend around a periphery or the entirety of an RFID tag structure 100. While a generally rectangular or quadrate shape is shown, it should be understood that the shape of the tag structure may include any geometric configuration. Additionally, the conductive loop 102 may be formed in any desired manner, for example being printed with a conductive ink, cut from a blank of material or having a preformed shaped transferred or deposited onto the substrate. Additionally, the conductive loop 102 may be formed such that it may surround or encompass an RFID chip 104. As seen in FIG. 1, the RFID chip 104 may be situated in a substantially centralized location of the structure 100, although, in other exemplary embodiments, the RFID chip 104 may be positioned in any desired location and may still be surrounded or encompassed by the conductive loop 102, or formed in any manner whereby the conductive loop 102 would be severed by any cutting tool prior to accessing or contacting the RFID chip 104. For example, the conductive loop 102 may be designed, printed or oriented in such a fashion that there may be no straight path from an outside of the structure 100 to the RFID chip 104. Thus a cut, for example by a knife or pair of scissors, or physical tearing would be unable to reach or affect the RFID chip 104 without first breaking the conductive loop 102.

In a further exemplary embodiment, the conductive loop 102 may be coupled to the RFID chip 104. For example, the conductive loop 102 may be coupled to the RFID chip 104 in such a manner that when the conductive loop 102 changes from a closed path to an open path one or more digital bits in a response to the queried RFID chip 104 may be altered. In one such embodiment, when the RFID chip 104 is queried or read and the conductive loop 102 is intact, a first response may be provided. However, when the RFID chip 104 is queried and the conductive loop 102 is not intact or otherwise non-functional, a separate response may be provided which can indicate that the conductive loop 102 is not intact or otherwise non-functional. For example, if a knife, pair of scissors, physical tearing or other instrument was used to cut the loop 102, a separate, alternative or different signal may be provided by the RFID chip 104 upon interrogation by a reader system (not pictured). This alternative signal may show a change in digital state of the RFID tag structure 100.

Further, in exemplary FIG. 1, a first end of the conductive loop 102 may be coupled to a first terminal 110 of the RFID chip 104, a second end of the conductive loop 102 may be coupled to a second terminal 112 of the RFID chip 104 and antennas 106 and 108 may be coupled to terminals 114 and 116, respectively, of RFID chip 104. There connections and terminals may be arranged in any desired fashion or orientation, depending on a desired layout of structure 100.

As further shown in exemplary FIG. 1, the conductive loop 102 may surround the RFID chip 104 as well as any antenna elements 106, 108 associated with the RFID chip 104. Thus, the conductive loop 102 may be breached and provide for an alternative signal to be sent prior to any contact or damage made to the RFID chip 104 or the antenna elements 106, 108 by, for example, a cut or a tear.

As described above, a breach or other form of damage to the conductive loop 102 may cause the conductive loop 102 to become an open circuit. When in such a state, the RFID chip 104 can change a bit or bits of a digital message that it sends back in response to an interrogation from a reader to indicate the change in condition. This response may be, for example, different from a response the RFID chip 104 would send when the conductive loop 102 was a closed circuit or otherwise unchanged or not breached or damaged. Additionally, although there may be a gap between a first terminal 110 of the conductive loop 102 and a second terminal 112 of the conductive loop 102, there may not be a direct path to the RFID chip 104 or the antenna elements 106, 108 that would allow for a cutting device, such as a knife or pair of scissors, to contact the RFID chip 104 or antenna elements 106, 108 prior without breaching the conductive loop 102. As shown in exemplary FIG. 1, the paths of the conductive loop 102 may be meandered, curved, zigzagged or otherwise formed in such a manner so that there is no direct path from outside of the structure 100 to the RFID chip 104 or the antenna elements 106, 108. Additionally, the gap between the first terminal 110 of the conductive loop 102 and the second terminal 112 of the conductive loop 102 may be very narrow, so as to further inhibit any potential breaches or cutting. For example, the gap may be about 100 μm, or smaller, and may be formed in any of a variety of manners, for example a laser cutting or ablation process or a printing process.

Figure 2:
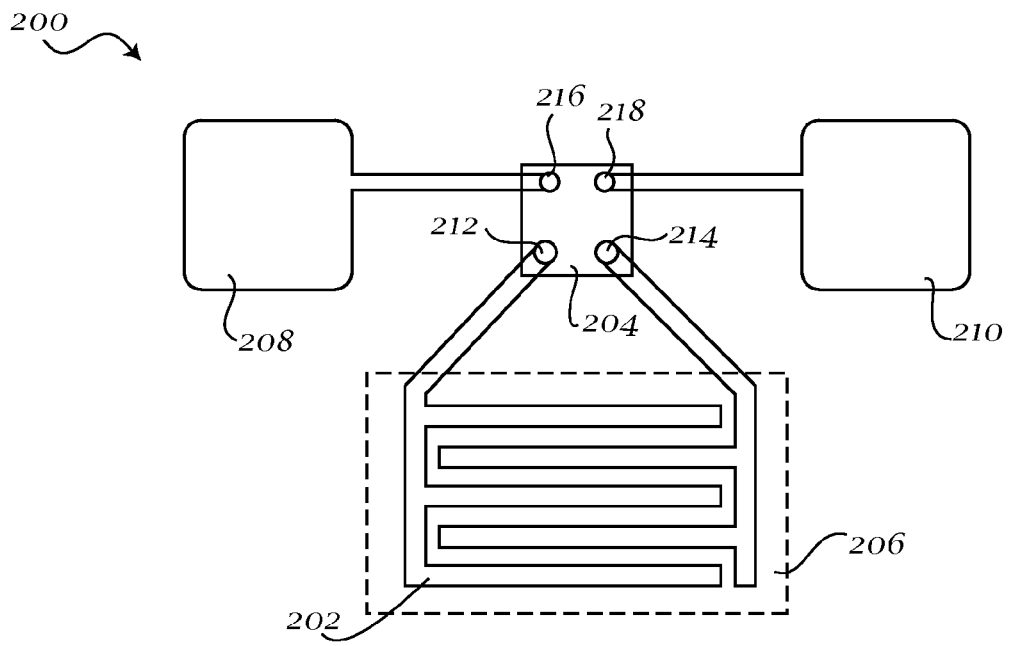
FIG. 2 is an exemplary view of an RFID label with interdigital fingers.
Figure 3:
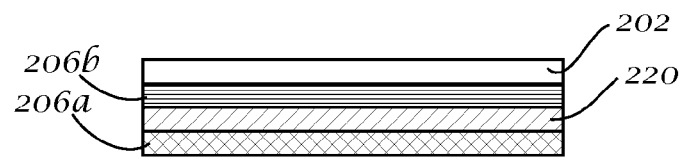
FIG. 3 is an exemplary side view of the RFID label shown in FIG. 2.

Exemplary FIG. 2 and FIG. 3 show another embodiment of a label 200 that can include RFID capabilities. In this exemplary embodiment, the label 200 may be able to detect when it has been removed from a surface. Here, the RFID chip 204 can sense the capacitance between the first terminal 212 and the second terminal 214 on the RFID chip 204 that are coupled to a conductive structure or material, for example a series of inter-digital metal fingers 202. In this exemplary embodiment, when the inter-digital metal fingers 202 are connected to the terminals 212, 214 of the chip 204 and when the label 200 is being read, and the inter-digital fingers are interacting with the conductive, dielectric or both parameters of that surface, or a structure coupled to the surface, the capacitance will be greater than a defined threshold, a first digital signal may be provided. However, if the capacitance presented by the inter-digital metal fingers 202 is changed, by, for example, a change in the dielectric or conductive environment in proximity to the finger structure, the capacitance may be lower than a defined threshold and a second, different digital signal may be provided by the chip 204 when it is read.

It will be appreciated by those skilled in the art that the opposite condition, that is a lower capacitance when in proximity and a higher capacitance when removed can be arranged and can equally be used for sensing separation.

Still referring to exemplary FIG. 2 and FIG. 3, the label and the connection of the inter-digital metal fingers to the terminals of the chip may be formed in any of a variety of manners. For example, the label 200 with the chip 204 may be formed in any manner known in the art. A conductive area 206, which can include the sensing area 206, an aggressive adhesive 206a, a weak adhesive 206b and a foil square 220 may then be formed in a sandwich-like manner and coupled to the tag structure 200 at terminals 212 and 214. Conductive area 206 may then be such that, after it is coupled to tag structure 200, the conductive area 206 may be coupled to a product through the use of aggressive adhesive 206a. As in the embodiments described above, when the tag structure 200 and conductive area 206 are coupled to a product using aggressive adhesive 206a, the RFID chip 204 may transmit a data message, when read, that indicates the tag is attached and/or that the RFID chip 204 is coupled with conductive area 206.

However, a separate signal may be transmitted in the event that the RFID chip 204 becomes decoupled from conductive area 206. In such a situation, for example if someone were to pull the tag structure 200 off of a product (or otherwise remove it) to which aggressive adhesive 206a was coupled, the aggressive adhesive 206a and the foil square 220, may remain adhered to the product. Thus, the capacitance presented by the inter-digital structure would be altered, and a different digital signal may be provided by RFID chip 204 when it is read. In other words, if the structure 206 with the conductive elements 202 is formed with an aggressive adhesive 206a that can aggressively stick to the product, any attempt to remove the tag structure 200 will result in a decoupling of the tag structure 200 and the conductive area 206. Thus, the digital signal provided by the chip 204 may be altered and the signal transmitted may be interpreted as showing the product or label has been altered or tampered with.

Alternative materials for layer 220 would include a material with a high dielectric constant, such as titanium dioxide, in the form of paint or incorporated into adhesive 206a. In this embodiment weak adhesive 206b may be omitted, and the back of the RFID tag structure 200 is coated with a material designed to release easily from adhesives, such as a silicone. In the event an attempt to remove the label is made, adhesive 206a with a high dielectric constant will stay with the product, altering the sensing area capacitance and hence the RFID chip 204 digital state when read.

In a further exemplary embodiment foil material 220 may have optical properties that are changeable in response to applied stress, for example a hologram or other structure. In the event that the label is removed from proximity to area 220 and then replaced, non reversible damage to the optical properties are caused. In addition, by using a thin layer of a relatively brittle metal, the breakage caused by the stress of removal may reduce the overall conductivity and hence alter the capacitance sensed by area 202.

Figure 4:
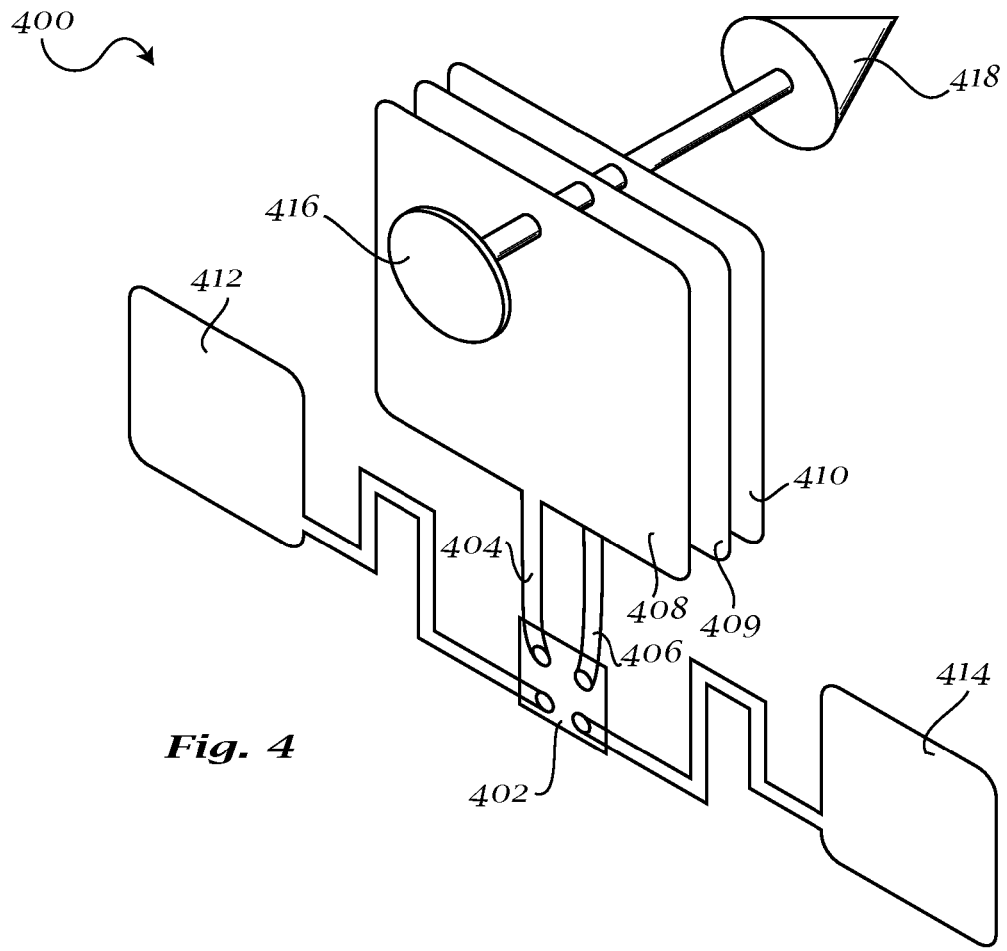
FIG. 4 is an exemplary view of an RFID label using a pin and clutch.

In exemplary FIG. 4, and in another embodiment, a pin and clutch arrangement may be used with an RFID tag. Here, the loop detect terminals 404, 406 of the chip 402 (as well as antenna elements 412 and 414) can be connected to separate conductive layers 408, 410, which may be a foil material and which may further be separated by an insulator 409. In this embodiment, prior to the attachment of the RFID tag 400 to a product (not pictured), the tag 400 may have an open path when it is constructed. However, the open circuit of the tag 400 may then be shorted together by the insertion of a metal pin 416. The metal pin 416 may be part of a pin 416 and clutch 418 security attachment structure, as is known in the art. Thus, as shown in exemplary FIG. 4, the digital signature of the chip 402, when it is read, may be different or unique for the tags that are attached and for that that have been detached from a product using the pin 416 and clutch 418 system. For example, when coupled to a product and read, the RFID chip 402 may send a first data message that is a result of the metal pin 416 coupling the conductive layers 406, 408 to the chip 402. However, if the overall structure of the tag 400 is tampered with and the metal pin 416 and clutch 418 are no longer retaining the tag 400 to a product, the pin may no longer connect conductive layers 408 and 410 and the signal provided by the chip 402 may therefore be different. Further, the attachment or detachment may be made or read at any desired location, for example at a point of sale or at any other location where it may be desirable to monitor the attachment of a tag to a product.

Figure 5:
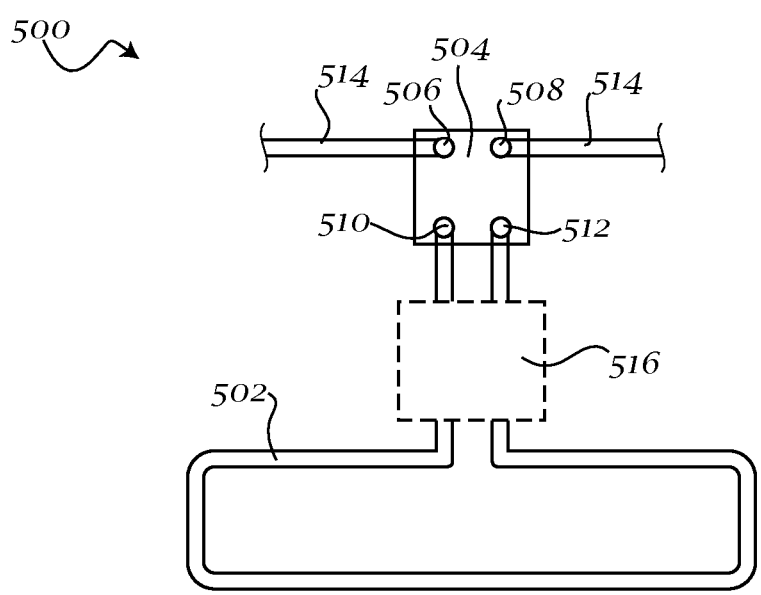
FIG. 5 is an exemplary view of an RFID label with a conductive loop and an RF block.

Referring now to exemplary FIG. 5, an arrangement for a label 500 with an RFID chip 502 having antenna connections 506, 508 and anti-tamper connections 510, 512 may be shown. In such an exemplary embodiment, it may be desirable to reduce the level of radio frequency (RF) voltage applied to the RFID chip 504 connections 510, 512 that are designated for a sensing loop 502 function, similar to that described in other exemplary embodiments, such with respect to FIG. 1. Additionally, it may be desired to reduce the interaction of the conductor used for the sensing loop 502 with the antenna structure 514.

Thus, in exemplary FIG. 5, an RFID chip 504 may have two pairs of connections. The first pair 506, 508 may be such that they connect to an antenna to allow communication with a reader system. The second pair of connections 510, 512 can then be utilized to determine the presence or absence of a path between the pair of connections 510, 512 and may further alter the retransmission of the RFID tag 500, accordingly. For example, the retransmission of the RFID tag 500 may be altered by changing the status of a bit in memory that can be read or be altering the rate or encoding of the data transmission from the tag. In still further alternatives, the change in the retransmission may be such that it is detectable by altering an analogue value related to the RFID tag's function, such as the operating frequency, sensitivity or backscattered signal strength.

Still referring to exemplary FIG. 5, to allow the sensing loop 502 to function and limit interaction between the loop 502 and antenna 514, an RF block, shorting, dissipation or combinational element 516 may be disposed between the chip 504 and the sensing loop 502. In still other alternative embodiments, the sensing loop 502 may be formed of those elements. Additionally, the RF block may be any element or combination of elements that can be used to alter or change an RF signal, for example one or more conductors, one or more inductors, one or more resistors, any other desired element or any combination thereof.

Figure 6:
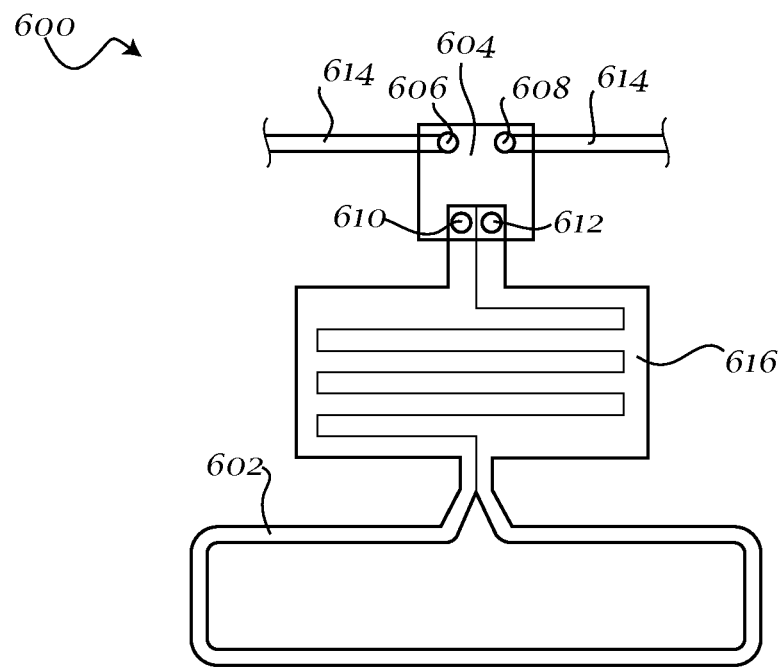
FIG. 6 is an exemplary view of an RFID label with a conductive loop with a capacitive area.

In exemplary FIG. 6, a structure 616 that connects to the sensing loop connections 610 and 612 that may function as a capacitor may be shown. The structure 616 may have a high enough capacitance that it can provide an effective short at the operating frequency of the RFID chip 604 across the pins without interfering with the sensing loop 602 functions and thus be useful in altering or changing an RF signal at a desired time or after an occurrence.

Figure 7:
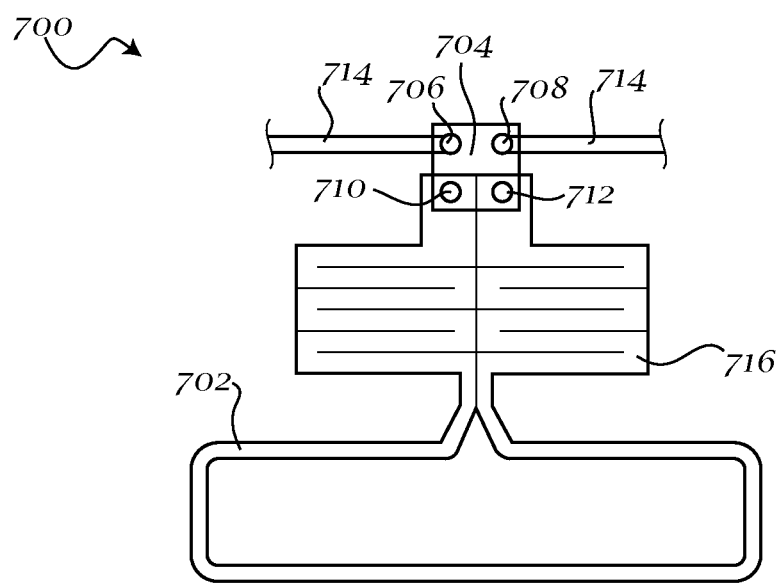
FIG. 7 is an exemplary view of an RFID label with a conductive loop and an inductive area.

In exemplary FIG. 7, a structure 716 for increasing the inductance between the sensing loop connections 710 and 712 and the sensing loop 702 may be shown. The structure 716 may be such that it can substantially increase the inductance between the sensing loop connections 710 and 712 and the sensing loop 702 such that the transmission of RF energy is blocked, effectively altering a digital signal sent from the tag 700.

Figure 8A:
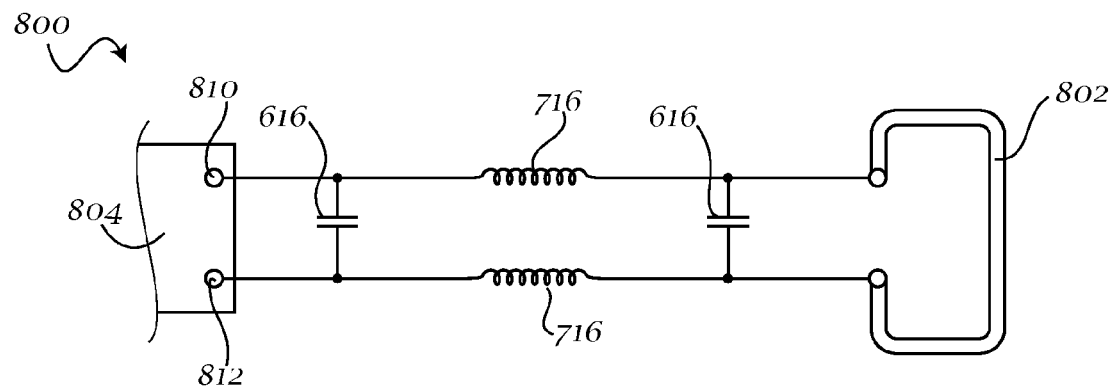
FIG. 8a is an exemplary view of an RFID label with a conductive loop, capacitive areas and inductive areas.
Figure 8B:
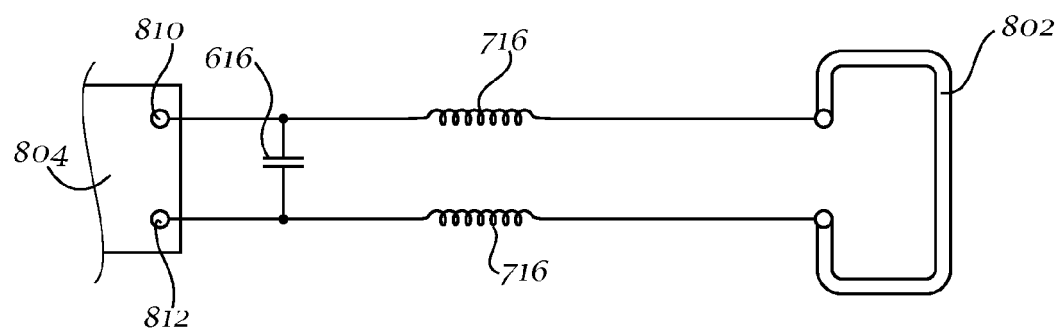
FIG. 8b is an exemplary view of an RFID label with a conductive loop, a capacitive area and inductive areas.
Figure 8C:
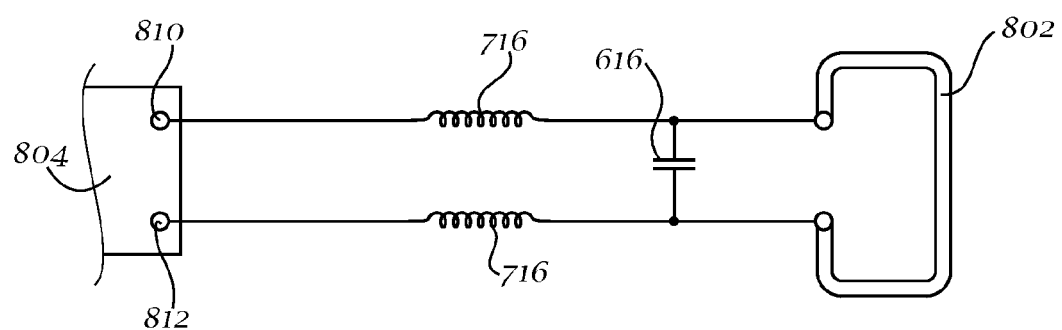
FIG. 8c is another exemplary view of an RFID label with a conductive loop, a capacitive area and inductive areas.

Exemplary FIGS. 8a, 8b and 8c may utilize a combination of elements from exemplary FIG. 6 and exemplary FIG. 7. Here, the structure 616 can act as a capacitor and the structure 716 can act as an inductor. Thus, there may be any number of desired manners of combining elements to effectively limit an RF signal at the sensing loop 802 connections 810 and 812 and reduce interaction with the chip 804 and any antenna elements.

Figure 9A:
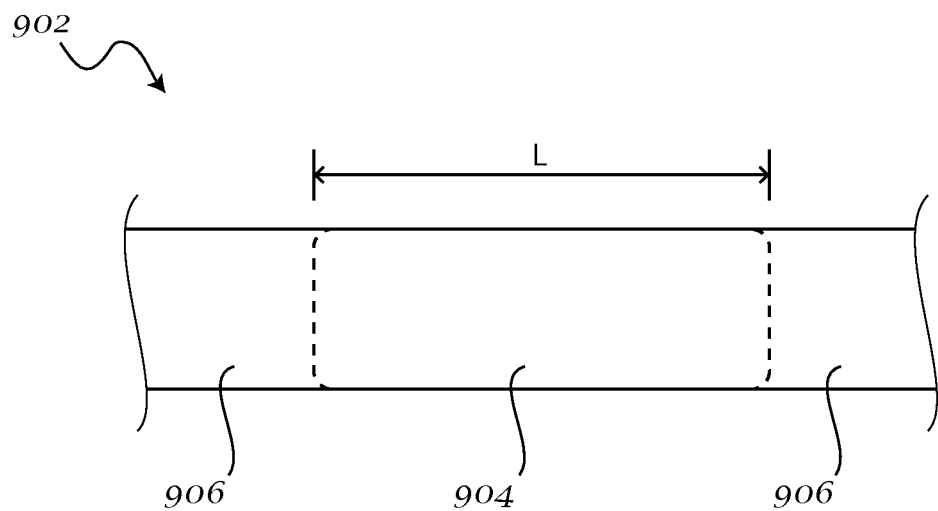
FIG. 9a is an exemplary view of a thinned area of a conductive material.
Figure 9B:
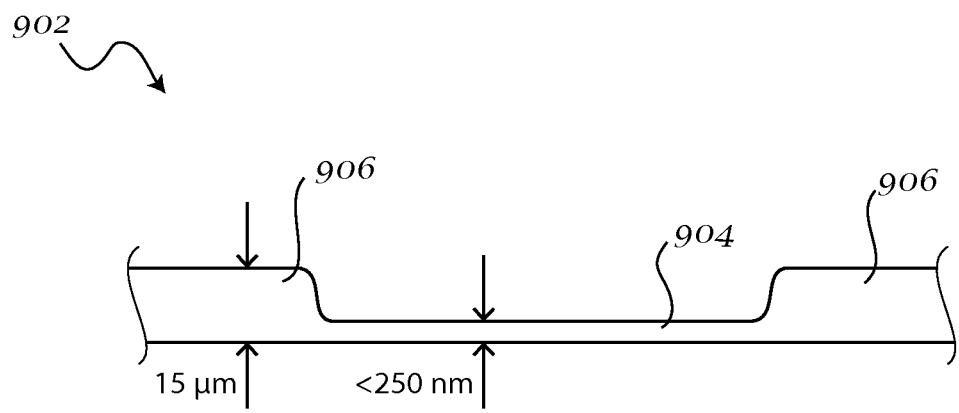
Figure 10A:
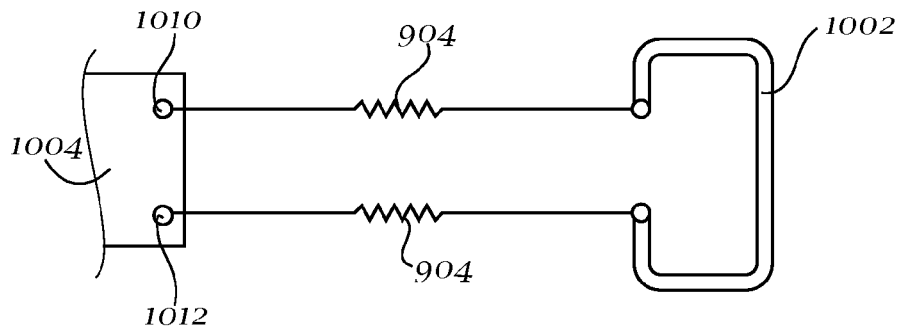
FIG. 10a is an exemplary view of an RFID label having a conductive loop and resistive areas.
Figure 10B:
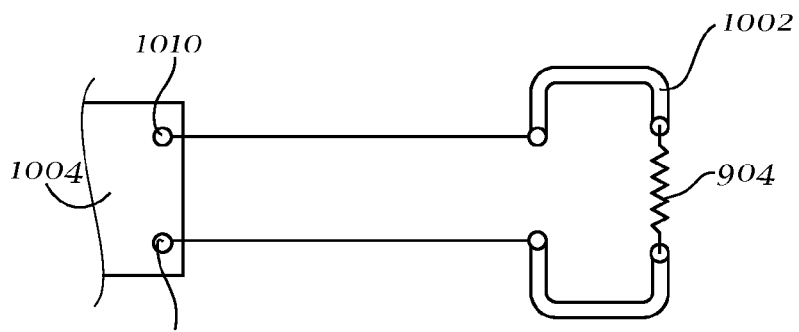
FIG. 10b is an exemplary view of an RFID label having a conductive loop and a resistive area.
Figure 10C:
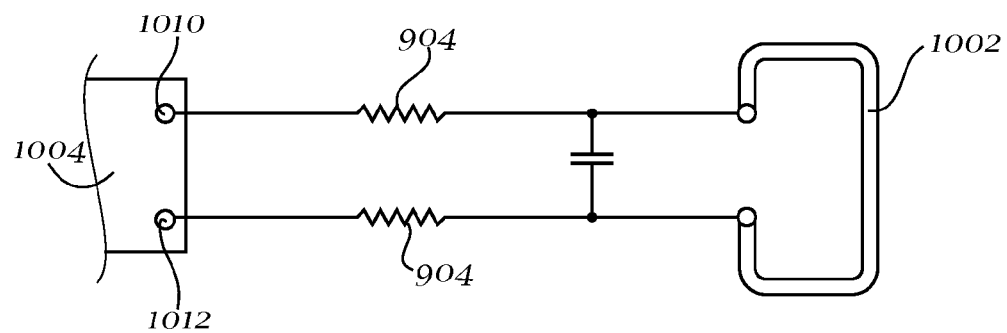
FIG. 10c is an exemplary view of an RFID label having a conductive loop, resistive areas and a capacitive area.
Figure 10D:
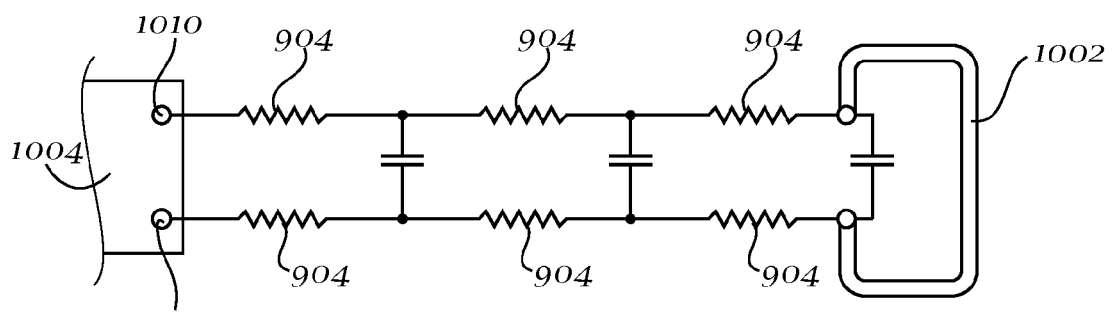
FIG. 10d is an exemplary view of an RFID label having a conductive loop, resistive areas and capacitive areas.

Exemplary FIGS. 9a and 9b can show a method of increasing the resistance of sections of the line of sensing loop 902. For example, in one embodiment, a laser may be used to selectively thin the metal of the sensing loop 902, for example in section 904, which may substantially increase its resistance, as opposed to sections 906 which are not thinned. Thus, as the thinning process makes the conductor thinner than one skin depth at the operating frequency, the resistance at the RF operating frequency is higher than that at DC. In this example, conductive loop may be about 15 um in un-thinned regions 906 and a section 904 of the loop 902 may be thinned to a thickness of about 250 nm, less than one skin depth, to achieve the desired resistance in the thinned section 904 and affect an RF signal in a desired manner.

Exemplary FIGS. 10a, 10b, 10c, and 10d show other embodiments where the resistive structures of FIG. 9 may be used. Here, the resistive structures can be used, either on their own or in combination with other elements, such as capacitors. Further, although laser ablation may be one manner of providing a thinned element for the loop, a loop may further be formed out of a relatively high resistance material, such as carbon ink.

In some further exemplary embodiments, any desired location, for example a dressing room or other area where video or visual surveillance is undesired or may utilize any number of RFID readers. The RFID readers may be such that they continuously or substantially continuously read any RFID tags that are located within a defined or designated scanning or reading area. Thus, the RFID readers can receive indications from RFID tags that indicate that the RFID tags are fully functional or intact, or that they are providing the appropriate or desired functionality. However, if an RFID tag in such a location is tampered with, for example by cutting the tag, a separate signal may be sent that indicates such a tampering has taken place. The separate signal, as described in similar embodiments, may be a result of a conductive loop on the RFID tag being cut or otherwise damaged or destroyed. Such cutting, damage or destruction may occur prior to any contact or damage with an RFID chip on the RFID tag.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A tamper indicating RFID label, comprising:
   an RFID chip having at least a first terminal and a second terminal;
   at least one antenna coupled to the RFID chip; and a conductive material forming a loop coupled to the RFID chip that influences a response signal sent from the RFID label when it is read such that when the conductive loop changes from a closed path to an open path one or more digital bits are altered, and wherein the conductive loop is configured such that,
a first end of the conductive loop is coupled to the first terminal of the RFID chip,
a second end of the conductive loop is coupled to the second terminal of the RFID chip, and
portions of the conductive loop near the first end of the conductive loop and the second end of the conductive loop are configured such that, between the portions, there is non-straight line access from an area outside the RFID label to a gap between the first terminal and the second terminal of the RFID chip.

2. The RFID label of claim 1, wherein the conductive loop is further configured such that exactly one line of the conductive loop substantially encircles the RFID chip and at least one antenna.

3. The RFID label of claim 1, wherein the conductive material is coupled to the RFID chip in such a manner that a cut or tear of the RFID label would sever the conductive loop prior to reaching the RFID chip.

4. The RFID label of claim 1, wherein the RFID chip transmits a first signal when interrogated and the conductive loop is intact and a second signal when interrogated and the conductive loop has been tampered.

5. The RFID label of claim 1, wherein portions of the conductive loop preceding the first end of the conductive loop and the second end of the conductive loop are arranged in a substantially zigzagged pattern.

6. The RFID label of claim 1, wherein the conductive material is a plurality of inter-digital fingers coupled to the RFID chip.

7. The RFID label of claim 6, wherein the inter-digital fingers have an aggressive adhesive disposed on a first side and a weak adhesive disposed on a second side.

8. The RFID label of claim 7, wherein the aggressive adhesive couples the inter-digital fingers to a product and the weak adhesive couples the inter-digital fingers to the RFID chip.

9. The RFID label of claim 1, wherein the conductive material is a pin, a first conduct layer and a second conductive layer.

10. The RFID label of claim 9, further comprising a clutch that couples the pin to the first conductive layer and the second conductive layer, the pin and the clutch further couple the RFID label to a product.

11. The RFID label of claim 1, further comprising an RF block coupled to the conductive loop.

12. The RFID label of claim 1, further comprising at least one capacitor coupled to the conductive loop.

13. The RFID label of claim 1, further comprising at least one inductor coupled to the conductive loop.

14. The RFID label of claim 1, wherein at least a portion of the conductive loop is thinned.

15. A method of preventing tampering to products having RFID tags, comprising:
sending a first signal from an RFID chip of an RFID label when a coupling between the RFID chip and a conductive material is intact, the RFID label includes
the RFID chip,
at least one antenna coupled to the RFID chip, and
the conductive material that forms a loop that is coupled to the RFID chip at a first terminal and a second terminal of the RFID chip, the loop configured to provide only non-direct access to the RFID chip from outside the RFID label and only between the first and second terminals of the RFID chip; and
sending a second signal from the RFID chip when the coupling between the RFID chip and at least a portion of the conductive material is not intact such that when the conductive loop changes, from a closed path to an open path, one or more digital bits are altered.

16. The method of claim 15 wherein the second signal is sent due to breaking, tearing or cutting of the conductive material.

17. The method of claim 15, wherein the conductive loop encircles the RFID chip.

18. A method of forming a tamper-resistant RFID tag, comprising:
disposing an RFID chip on a substrate;
disposing at least a first antenna element on the substrate;
coupling the at least first antenna element to the RFID chip;
disposing a conductive loop on the substrate; and
connecting a first portion of the conductive loop to a first terminal on the RFID chip and connecting a second portion of the conductive loop to a second terminal on the RFID chip in such a manner that there is no straight-line access from an area outside the RFID tag to the RFID chip, and access is available to the RFID tag only via a gap between the first terminal and the second terminal, and
wherein the RFID chip and conductive loop are configured such that when the conductive loop changes from a closed path to an open path one or more digital bits are altered.

* * * * *